Dec. 8, 1925.  
S. B. WINN  
TRACTOR  
Filed Aug. 11, 1924

Inventor  
Sidney B. Winn,  
By  
Attorney

Dec. 8, 1925.  
S. B. WINN  
TRACTOR  
Filed Aug. 11, 1924

Inventor  
Sidney B. Winn

Attorneys

Patented Dec. 4, 1925.

1,564,740

UNITED STATES PATENT OFFICE.

SIDNEY B. WINN, OF LAPEER, MICHIGAN.

TRACTOR.

Application filed August 11, 1924. Serial No. 731,352.

*To all whom it may concern:*

Be it known that I, SIDNEY B. WINN, a citizen of the United States, residing at Lapeer, in the county of Lapeer and State of Michigan, have invented certain new and useful Improvements in Tractors, of which the following is a specification, reference being had therein to the accompanying drawings.

This invention has reference to motor vehicles, and more particularly to those of the tractor type intended for hauling heavy loads on trailers or attachments applied or coupled to the tractor. In certain types of motor vehicles or tractors the inertia of the load of the first motion or the driving wheels has the effect of raising the forward part of the vehicle often to such an extent that the front wheels are lifted from the ground, this effect being particularly noticeable in vehicles or tractors of short wheel base and being aggravated by the passage of the vehicle over rough or undulating ground. Naturally this action is most undesirable and quite often dangerous as it materially diminishes and in some respects renders entirely impossible the control of a vehicle, as well as throwing undesirable strains upon parts of the vehicle or upon a trailer attachment which may be secured thereto. It is, therefore, an object of this invention to provide for the counteracting of this peculiarity in a motor vehicle in a simple and efficient manner, and a still further object is to obtain a very desirable resiliency in the vehicle at the same time.

It is also the purpose of this invention to provide a novel chassis arrangement in such a vehicle, wherein the chassis is transversely divided and the separated parts connected in a manner permitting vertical flexing of the said parts with respect to one another; and a further object is to provide for the vertically flexible connecting together of front and rear sections of the chassis together with means yieldably resisting the flexion of the said chassis about the connection.

A still further object is to provide a vertically flexible attachment for connecting the front and rear parts of a divided chassis together and damping means yieldably resisting the flexion of said attachment.

Still further objects subsidiary to or resulting from the aforesaid objects, or from the construction or operation of the invention as it may be carried into effect, will become apparent as the said invention is hereinafter further disclosed.

In carrying the said invention into effect I may provide for the transverse division of the chassis of a tractor or motor vehicle, the front and rear parts of the said chassis being substantially spaced apart, and within such space I propose to insert an attachment comprising a pair of members flexibly connected together for vertical flexion, such as by hinges or flexible straps, the said members being respectively attached to the front and rear parts of the divided chassis, and resilient means such as springs preferably arranged above and below the flexible connection of said members and yieldably resisting the flexion thereof whereby a damped vertical movement about the center part of the vehicle may take place under the influence of forces acting perpendicular to the chassis. All of which is more particularly described and ascertained hereinafter by way of example having reference to the accompanying drawings, wherein—

Similar characters of reference indicate similar parts in the several figures of the drawing.

Figure 1:
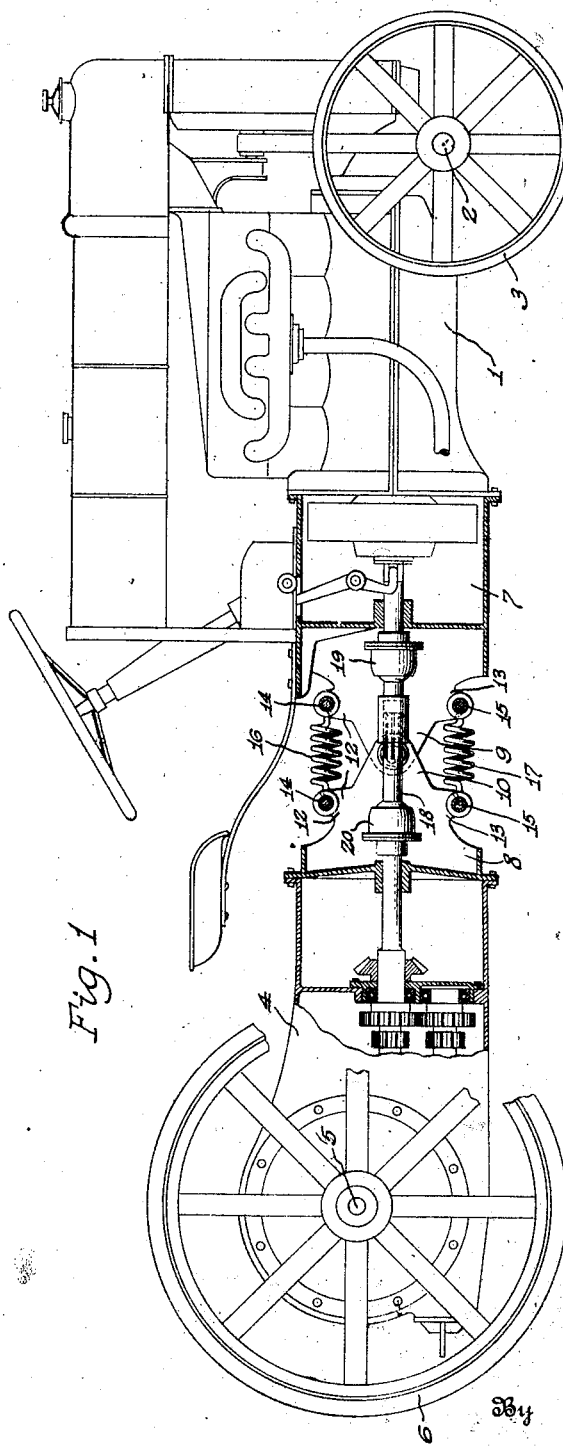
Figure 1 is an elevation partly broken away of a tractor embodying the said invention.
Figure 2:
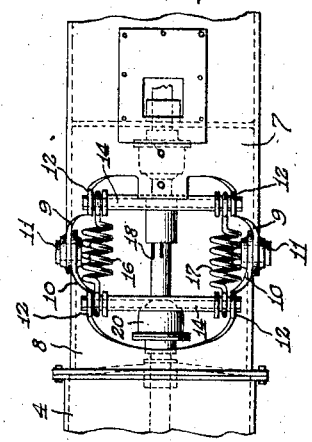
Figure 2 is a broken plan view of part of the tractor chassis.
Figure 3:
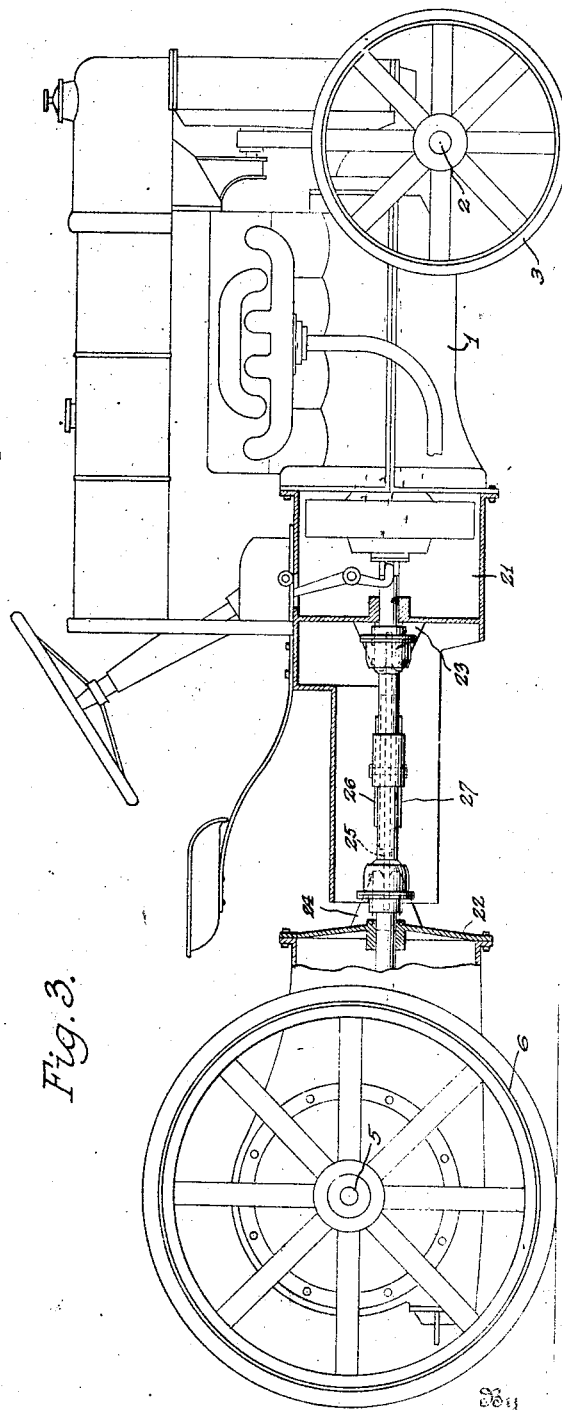
Figure 3 is a similar view to Figure 1 illustrating a modified arrangement.
Figure 4:
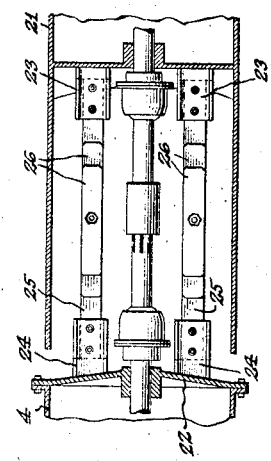
Figure 4 is a similar view to Figure 2 illustrating such modified arrangement.

For the purpose of simplicity the invention is illustrated as being applied to a standard make of tractor although it will be obvious that it may be incorporated in a specially designed tractor or in one of any other make the chassis of which is capable of being divided into front and rear sections. 1 indicates the front section mounted upon the axle 2 of the wheels 3 and 4, the rear section mounted upon the axle 5 of the wheels 6, these sections being hitherto rigidly bolted together. In this instance the opposed ends of the said chassis sections 1 and 4 are substantially spaced apart and provided with connecting means in the form of extensions 7 and 8 bolted to the opposed ends of the said sections 1 and 4, respectively, as shown in Figures 1 and 2 to which attention is being first directed.

The extension 7 has formed thereon rearwardly projecting members 9 which overlap and are hingedly connected to forwardly projecting members 10 on the extension 8 by pintles 11, and both the members 9 and the members 10 are provided also with upper and lower ear pieces 12 and 13, respectively, 14 being transverse rods extending between the upper ear pieces of each extension and 15 rods extending similarly between the lower ear pieces. These rods tend to relieve lateral strain on the extensions 9 and 10 to some extent, and also serve for the reception of the terminals of springs 16 extending longitudinally of the chassis between the ear pieces of the two extensions and similar springs 17 extending between the lower ear pieces.

Figures 5, 6, 7:
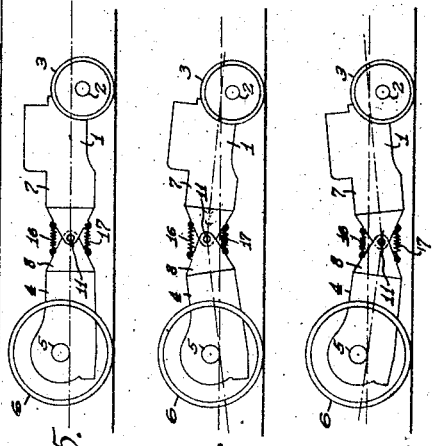
Figure 5 is a diagrammatic view of the chassis showing the two parts of the chassis in normal relation.
Figure 6 is a similar view to Figure 5 illustrating the upward vertical flexion of the chassis under the influence of a correspondingly applied force.
Figure 7 is a further diagrammatic view illustrating the opposite flexion of the chassis.

The hinged connection of the extensions of the chassis admits of the flexion of the said chassis upwardly or downwardly and the springs 16 and 17 resist such flexion tending to maintain the chassis in normal horizontal alinement, downward flexion being only possible by the yielding of the lower springs and the upper flexion by the yielding of the upper springs, as indicated in Figures 7 and 6, respectively, Figure 5 indicating the normal alinement.

The transmission shaft is shown as being extended by an intermediate splined shaft 18 disposed between two universal joints 19, and 20 to extend the driving or propellor shaft upon the extension of the chassis in the manner described.

In practice, particularly with tractors of short wheel base, the first motion of the tractor actuating about the rear axle thereof exerts a force tending to raise the forward end of the tractor from the ground, this quite often becoming effective particularly when the tractor is hauling a heavy load or when the nature of the ground is such that it tends to assist in such raising by resisting the progression of the forward wheels. This peculiarity is sometimes so exaggerated that the forward wheels will remain suspended out of contact with the ground for considerable intervals, preventing the steering of the tractor and otherwise interfering with its proper control as well as throwing excessive strains upon the rear axle, chassis of the vehicle or upon connections which may exist therebetween and a trailer which may be coupled thereto.

By the embodiment of this invention in such a vehicle, the effect of this force is that indicated in Figure 6 of the drawings wherein the chassis is flexed upwardly against resistance of the springs 16 which prevent its taking place to an undesirable extent, the result being the storage of energy in the chassis which energy is concentrated on the axle of the front wheels tending to overcome the inertia in the forward part of the vehicle and ensure its eventual progression along the roadway; a force also being directed on the said front axle and maintaining the front wheels in contact with the said roadway during the lifting effect of the first motion. The ensuing progression of the front wheels, as a result of the force of stored energy, will be somewhat greater than that of the rear wheels so that the chassis will assume its normal alinement, Figure 5, and in the event of forces acting upwardly against the front or the rear axles, or of the reflex action forwarding the application of the flexion force referred to, a downward flexing of the chassis may take place as shown in Figure 7; so that it will be seen that the arrangement described adds to the general resiliency of the chassis relieving bending strains therein and adding to the comfort of the operator. Generally speaking, most of the forces operating vertically of the chassis will be transmitted to the springs 16 and 17 and thereby absorbed and as a result the suspension of the engine, transmission and gearing is accordingly improved.

It is preferred that the arrangement incorporating the flexible intermediate connection in the chassis be such as that illustrated wherein greater length is given to the chassis when normally it is of short wheel base, such greater length also assisting in resisting the tendency of the forward part of the chassis to be raised in the manner referred to.

In Figures 3 and 4, 21 and 22 indicate somewhat modified types of extensions, the projecting members 23 and 24 of which do not overlap but are connected by flexible hinge members 25 corresponding to the pintles 11, which hinge members are controlled in their action by upper leaf springs 26 corresponding to the springs 16 and also leaf springs 27 corresponding to the springs 17. The action is similar to that of the arrangement shown in Figures 1 and 2, both of the said arrangements being characterized by the fact that the front and rear sections of the chassis are hingedly coupled together and provided with resilient means damping the flexion of the chassis.

The suggested device may be readily incorporated in a chassis without great expense and is extremely effective in preventing the aforesaid undesirable lifting of the forward part of the vehicle from the ground, under conditions normally tending to bring this about, and the efficiency of the vehicle in which the said invention is incorporated is accordingly improved.

This invention may be developed within the scope of the appended claims without departing from the essential features of the said invention, and it is desired that the specification and drawings be read as being merely illustrative and not in a limiting sense, except as necessitated by the prior art.

What I claim is:

1. Means for increasing the length of a comparatively short tractor wherein the transmission housing is separable from the engine block of the tractor, and wherein the front and rear parts of the tractor are to be flexibly connected, said means comprising interposed extensions attached respectively to the transmission housing and engine block, said extensions being coaxially of each other, and hingedly connected members carried by said extensions and connecting said extensions at opposite sides of the axis of said extensions.

2. Means for increasing the length of the tractor as set forth in claim 1 further characterized by longitudinally disposed resilient means extending from one extension to the other and adapted to hold said extension normally coaxial yet permit of angular relation therebetween.

3. In combination with the front and rear axles of a motor vehicle, a sectional chassis comprising a front part and a rear part mounted on the front and rear axles respectively, said parts having overlapped portions connecting said front and rear parts together in vertically flexible relation, and resilient means in planes above and below the overlapped portions of said parts resisting the flexing of said parts.

4. In combination with front and rear axles of a motor vehicle, a sectional chassis comprising a substantially cylindrical front part and a substantially cylindrical rear part mounted on the front and rear axles respectively, and a vertically resilient connection between the front and rear parts of said chassis, said connection comprising a pair of relatively vertically flexible extensions secured intermediate of said sections and hingedly connected on a transverse axis of a vehicle, said extensions being provided with resilient damping means above and below the hinge axis.

5. In combination with front and rear axles of a motor vehicle, a sectional chassis comprising a substantially cylindrical rear part mounted on the front and rear axles respectively, said front and rear parts being normally coaxially of each other, and a vertically resilient connection between the front and rear parts of said chassis, said connection comprising a pair of relatively flexible extensions secured intermediate of said sections with the front ends of said extensions connected by side hinges, springs in a plane above the side hinges of said extensions damping the upward flexion thereof, and further springs in a plane below the side hinges of said extensions damping the downward flexion thereof.

6. Means for increasing the length of a comparatively short tractor wherein the transmission housing is separatable from the engine block, and wherein power may be transmitted from the engine block to the transmission housing, and wherein the front and rear tractor parts are to be flexibly connected, said means comprising interposed hinged connected together extensions attached to the transmission housing and engine block, and a telescopic transmission shaft extending from one extension into the other.

7. In a motor vehicle, a front part, a rear part in space relation to said front part, so that there is a gap between said parts permitting the confronting ends of said parts to shift in a vertical direction independent of each other, an extensible driving connection between said parts, and a flexible connection between said parts disposed parallel to said driving connection.

In testimony whereof I affix my signature.

SIDNEY B. WINN.